United States Patent [19]

Allen et al.

[11] Patent Number: 4,737,660

[45] Date of Patent: Apr. 12, 1988

[54] TRIMMABLE MICROMINIATURE FORCE-SENSITIVE SWITCH

[75] Inventors: Henry V. Allen, Fremont; John H. Jerman; Stephen C. Terry, both of Palo Alto, all of Calif.

[73] Assignee: Transensory Device, Inc., Fremont, Calif.

[21] Appl. No.: 930,703

[22] Filed: Nov. 13, 1986

[51] Int. Cl.[4] ........................ H02B 1/24; H01H 35/00

[52] U.S. Cl. .................................... 307/112; 307/117; 307/118; 200/83 N; 200/61.45 R; 200/61.51

[58] Field of Search ........................ 307/112, 117, 118; 200/83 N, 83 A, 83 V, 61.25, 61.45 R, 61.48, 61.49, 61.51

[56] References Cited

U.S. PATENT DOCUMENTS 4,016,483 4/1977 Rudin .................................... 323/74

4,543,457 9/1985 Petersen et al. .................. 200/83 N

*Primary Examiner*—William M. Shoop, Jr.
*Assistant Examiner*—Sharon D. Logan
*Attorney, Agent, or Firm*—Fitch, Even, Tabin & Flannery

[57] ABSTRACT

A trimmable microminiature force-sensitive switching device for detecting the state of external conditions, such as pressure, acceleration and temperature, is disclosed. The device includes a silicon substrate having a reduced-thickness, deflectable member adapted to change its deflection in response to changes in the external condition to be detected. Increasing deflection of the member establishes electrical contact between a common contact and first one, then progressively more, spaced electrical contacts of a plurality of switches. Each of the spaced electrical contacts is connected to a common terminal. Trimming of the switching device is accomplished by application of a preselected external force, such as pressure, that causes the deflection of the deflectable member and the closing of one or more of the switches. Electrical energy is then applied to the external terminal of the common contact and the external terminal of the common terminal of the fusible links, such that current flows through the switches that have closed and through their associated fusible links, causing those fusible links to open circuit, thereby precluding the subsequent detection of external conditions whose level is at or below the preselected level applied during trimming of the device.

15 Claims, 2 Drawing Sheets

TRIMMABLE MICROMINIATURE FORCE-SENSITIVE SWITCH

BACKGROUND AND SUMMARY

The present invention relates to a microminiature force-sensitive switch capable of being trimmed to detect changes in an external condition.

Microminiature switches responsive to changes in external conditions are known in the art, as exemplified by U.S. Pat. No. 4,543,457 to Petersen. The switch therein described includes a silicon wafer having a reduced-thickness deflectable membrane which moves in response to changes in external conditions and thereby establishes contact between a common terminal and first one then progressively more confronting terminals of the switch device.

The Petersen apparatus teaches one embodiment of the switch in which the deflectable member takes the form of a diaphragm etched in a silicon substrate which is adapted to bulge from its relaxed state to a more strained state in response to an increase in an applied external force. This force may comprise a pressure differential, which requires that one side of the diaphragm remain at a constant pressure. This can be accomplished by forming a hermetically sealed chamber around this side of the diaphragm. When the switch is to be used to measure acceleration, a mass may be attached to the diaphragm. The diaphragm also may be modified to include a metal layer having a substantially different thermal coefficient of expansion than that of the diaphragm to enable the measurement of temperature changes.

Another embodiment of the switch taught by Petersen is an elongated beam anchored at one or both ends which deflects in a manner analogous to the function of the diaphragm in digitizing or monitoring temperature or acceleration.

It is generally known in the art that switching devices may be trimmed so as to set the threshold level of detection. Trimming has been accomplished by chemical and laser techniques and is a major component of the total cost of trimmed devices. The trimming techniques generally use a plurality of external taps or pads for accessing the switching devices, and depend for their effectiveness on the closing of switches in a particular order for each individual device.

The prior art described above has not overcome several problems that are addressed and solved by the present invention. For example, Petersen teaches a switching device that is responsive to changes in external conditions such as temperature, pressure or acceleration, yet the fabrication and operation of the device to detect a particular threshold level of the changing external condition is not achievable in the most efficient and cost effective manner due to structural limitations in the Petersen apparatus. Specifically, leads must be extended from each switch to external taps or pads in order to calibrate the device. As a preselected force is applied to the deflectable member, each switch must be monitored for closure in order to determine which switch closes at a desired deflection level. Such a necessary procedure is time consuming and labor-intensive, which increases the cost of each device and renders the device unsuitable for mass production.

The cost is also raised by the extra materials and parts required and by the more frequent failure of the hermetic seal due to the need for penetration of the seal by multiple switch leads. Moreover, because such devices require more switch leads and taps or pads, the number of switches on each device is physically limited. This limits the achievable precision of detection and increases the user's cost by requiring the purchase of more devices to accomplish a given operation. Furthermore, the probability of failure of a device increases with increasing complexity and with the addition of elements. The extra lead, taps, etc., also increase the physical size of each device, which limits its application.

Although the use of fusible links in an integrated circuit is known, such use has generally been limited to applications involving read only memory elements or the fixing of an impedance value. In U.S. Pat. No. 4,016,483 to Rudin, for example, the impedance value in a microminiature integrated circuit by the selective blowing of fuses is shown. The device therein described includes fusible aluminum links in parallel with binary weighted resistive elements. The application of electrical energy to selected fusible links causes them to open, thereby inserting selected resistive elements into the impedance circuit.

The prior art does not teach the use of fusible links to enable trimming of a switching level, nor such a use that does not depend on the designer-intended order of operation of the trimming switches.

To overcome these limitations and disadvantages of the prior art, the present invention combines a deflectable member, a plurality of switches, and fusible links in such a way so as to produce a device which is compact, less costly to produce, and which can be trimmed or calibrated after the device has been fabricated without regard to the order of operation of the switching elements of the device as set by the design and tooling and without requiring the leads from each switch to be available for external connection during this calibration process.

It is therefore a general object of the present invention to provide a microminiature switching device for detecting or monitoring of a threshold level of an external condition such as pressure, temperature or acceleration, the switching device being designed so that the threshold level to be detected or monitored is easily and accurately calibrated and so that the device is reliable in operation subsequent to its calibration.

Another object of this invention is to reduce the cost of manufacturing and trimming such a switching device.

A further object of this invention is to provide a method for trimming the switching device that is independent of the order of operation of the switches of the device.

A more specific object of the invention is to provide a microminiature switching device whose elements are contained within a hermetically sealed chamber.

Another object of this invention is to minimize external connections to the elements of the switching device to minimize the number of required penetrations of the hermetic seal so as to reduce the possibility of seal failure.

The present invention achieves these objects by providing a reliable, low-cost, microminiature force-sensitive switching device which is capable of being easily trimmed without the necessity of a plurality of additional external connections to the apparatus and without regard to the operational order of its elements, resulting in a device which accurately and reliably senses a selected external condition within a desired range.

According to the present invention, the switching device includes a deflectable member whose deflection is caused by changes in an external condition to be detected, such as temperature, pressure or acceleration. Movement of the deflectable member from a less strained to a more strained condition causes the establishment of electrical contact between a common contact and first one then progressively more switch terminals in the device. The circuit is completed by the series connection of each switch to a fusible link whose other terminal is tied in common with all other fusible links in the switching device which is in a common terminal. The common terminal connected to the fusible links is, in the preferred embodiment, within the chamber formed by the hermetic sealing of a first substrate, including the deflectable member, and a second substrate. From the common terminal, a single conductor is passed through the seal to enable electrical connection of the device to an external calibrating or monitoring circuit. This reduction in the number of seal penetrations reduces the seal failure rate.

The trimming of the device to preselect the threshold value of the external condition to be detected is accomplished easily, accurately and reliably. A chosen calibrating level of the external condition is applied to the device. The resultant force causes the deflection of the deflectable member and consequent closing of one or more switches. A voltage is then applied to the common terminals of the device, causing a current to pass through the closed switches and the fusible links connected in series with them. These fusible links are permanently blown, while the fusible links connected in series with the switches which did not close on application of the calibrating condition are not blown.

The result is that the switches whose fusible links were open-circuited can no longer be connected to the common terminal on subsequent application of a force on the deflectable member. Only at a level of force greater than the threshold defined by the externally applied calibrating condition will the deflectable member move sufficiently to close an additional one or more switches to create a conductive path between the external terminals and thereby enable the generation of an electrical signal indicative of the level of the external condition exceeding this threshold level. By connecting each switch in said switching device to a fusible link, it is possible automatically to trim the device, enabling multiples of the switching devices to be trimmed at once, without requiring identification of the particular switches that are closed or open at any level of the external condition.

These and other objects, features and advantages of the present invention will become more apparent to those skilled in the art from the following detailed description of the invention in conjunction with the accompanying drawings.

DETAILED DESCRIPTION OF THE INVENTION

Figure 1:
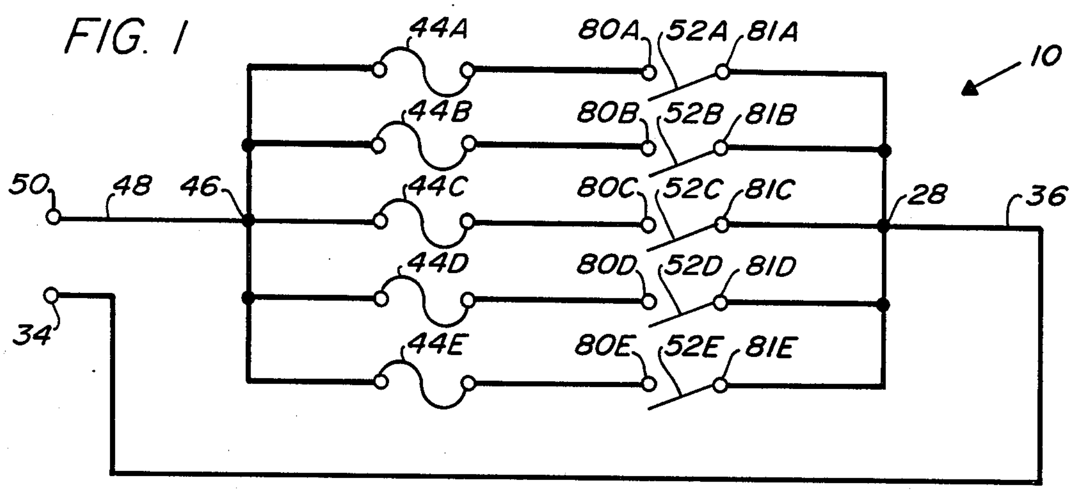
FIG. 1 is a schematic diagram of a trimmable, force-sensitive switching device constructed according to a preferred embodiment of the present invention.

FIGS. 1–5 illustrate the present invention. Referring first to FIG. 1, shown is a schematic of a switching device 10 according to the present invention. Switching device 10 includes a plurality of switches 52A–52E whose closure is a function of the operation of a deformable member, as described below. A first electrical contact of each switch 52, identified as 80A–80E for respective switches 52A–52E, is coupled to a common terminal 46. Connected in series between said common terminal 46 and each switch 52 is a fusible link 44. As seen, fusible links 44A–44E are connected in series to corresponding switches 52A–52E. The opposite pole of each switch 52A–52E, identified as 81A–81E, comprises a common terminal 28. Common terminal 28 is connected to an external terminal 34 and common terminal 46 is connected to an external terminal 50.

Figure 2:
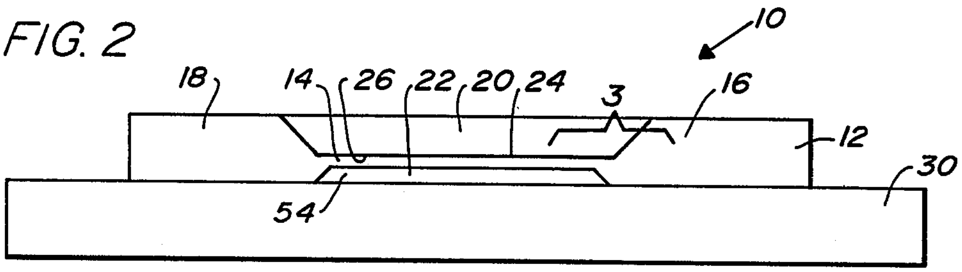
FIG. 2 is a cross-sectional view of the switching device according to the present invention illustrating a preferred embodiment of a deformable member.
Figure 3:
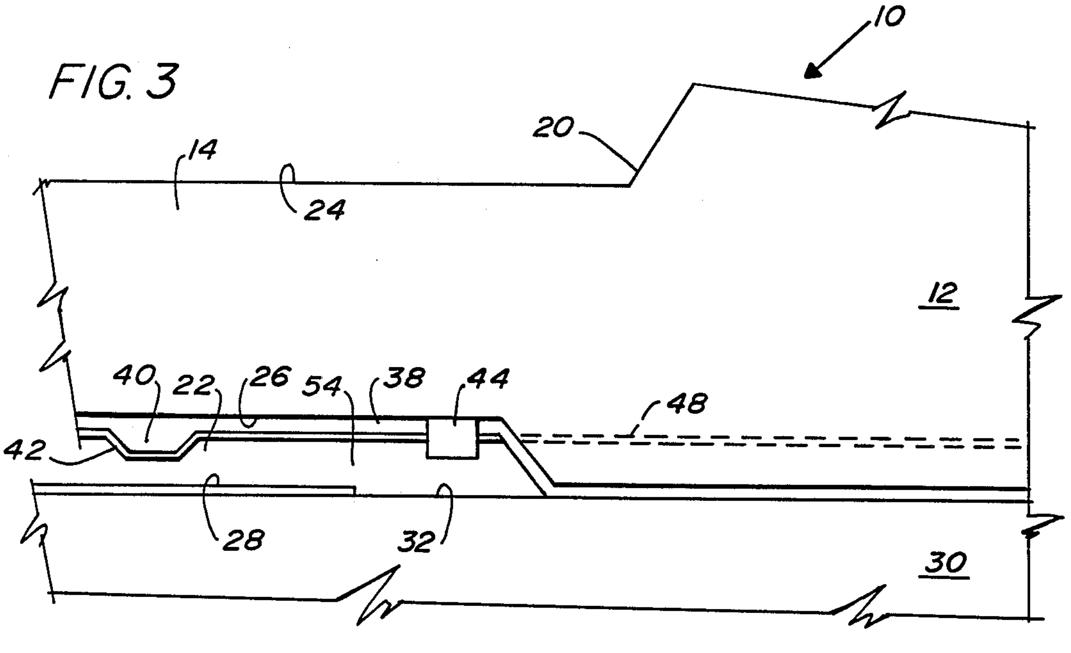
FIG. 3 is an enlarged, fragmentary sectional view of the switching device, taken generally in the region indicated by bracket 3—3 in FIG. 2.
Figure 4:
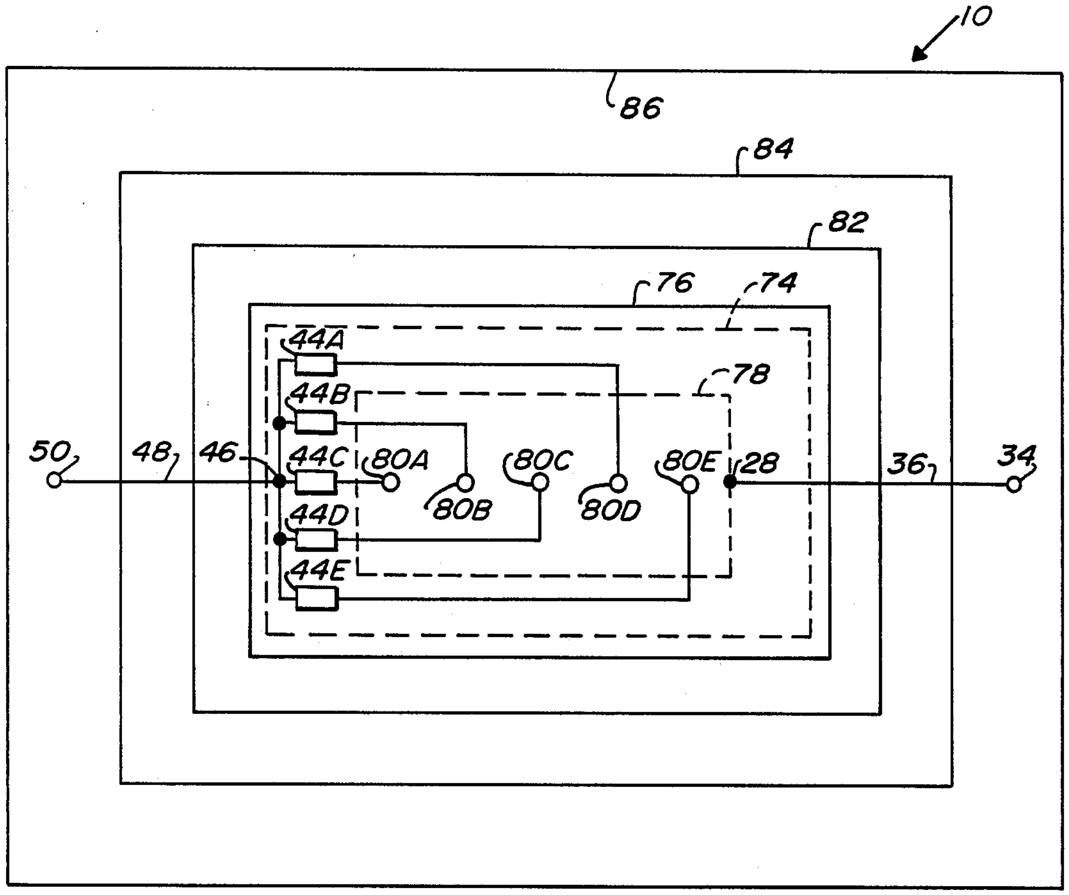
FIG. 4 is a partially diagrammatic plan view of the switching device of FIG. 2.

With reference to FIGS. 2, 3 and 4, the switching device 10 includes a first substrate 12, preferably of silicon, having a reduced-thickness, deflectable member 14 formed in the central portion thereof. As best seen in FIG. 2, the deflectable member 14 is integrally formed with and bordered by relatively thick side regions 16 and 18, of the first substrate 12. Deflectable member 14 includes an outer recess 20 and an inner recess 22 which are formed from the first substrate 12 by etching. The planar interior surface of the outer recess 20 forms the outer surface 24 of the deflectable member 14. The planar interior surface of the inner recess 22 forms the inner surface 26 of the deflectable member 14.

A second substrate 30 is positioned with respect to deflectable member 14 so as to create a chamber 54 formed by the two substrates 12, 30 and deformable member 14. Second substrate 30 is made preferably of glass. Chamber 54 may be a hermetically sealed chamber formed in a conventional manner.

FIGS. 2 and 3 show the deflectable member 14 in a relaxed, planar position resulting from the absence of a net external force across the member 14. Upon application of an increasingly greater net external force, such as pressure, across the member 14, the member 14 deflects from the relaxed position to increasingly strained positions. This movement produces an inward bulge of the member initially from the central region of the member, a bulge which spreads outwardly toward the sides of the member as greater external force is applied.

FIG. 3 shows the surface portion 32 of the second substrate 30 confronting the inner surface 26 of the deflectable member 14. A common contact 28, preferably a planar conductive surface, is carried on the surface 32 and is connected to the first external terminal 34 (shown in FIG. 4) by a first external connecting means 36, preferably a single conductor, which passes through the hermetic seal formed between the first substrate 12 and the second substrate 30. FIG. 3 also shows a fragment of the deflectable member 14, the inner surface of which is coated with a thin silicon dioxide insulating layer 38. The spaced electrical contacts 80A–80E preferably are carried in a spaced apart relation on the inner surface 26 of deflectable member 14 in a position confronting the common contact 28. The spaced electrical contacts 80A–E comprise a plurality of contact buttons, represented by contact button 40 in FIG. 3, which may be formed integrally with insulating layer 38 and which have the generally truncated conical shape shown. The buttons 40 are coated with a layer 42 of an electrically conductive metal, preferably aluminum or gold. Alternatively, contact buttons 4D may be formed as part of layer 42. A plan view of electrical contacts 80A–80E is shown in FIG. 4.

As seen in FIG. 4, the boundary defining the inner surface 26 of deflectable member 14 is shown by the dashed line 74. The boundary of the outer surface 24 of deflectable member 14 is shown by the solid line 76. The boundary of the common contact 28 is shown as the dashed line 78. The inner boundary of the thick side regions 16 and 18 of the first substrate 12 is shown as line 82 and the outer boundary of the thick side regions 16 and 18 of the first substrate 12 is shown as line 84. The outer boundary of the second substrate 30 is shown as line 86.

As also seen in FIG. 4, the common contact 28 is connected to the first external terminal 34 by the first external connecting means 36 which passes though the hermetic seal between the first substrate 12 and the second substrate 30. Each of the spaced electrical contacts 80A–E is connected by a conductor to the first terminal of one of a plurality of fusible links 44A–44E. The fusible links 44A–44E are made of a conductive material which is designed to open circuit upon the passage of a preselected current through the links. The second terminals of the fusible links 44A–44E are connected to the common terminal 46 within the sealed chamber 54. The second external connecting means 48, preferably a single conductor, leads from the common terminal 46 through the hermetic seal between the first substrate 12 and the second substrate 30 to the second external terminal 50 which is adapted for connection to external detecting, monitoring or other circuits.

As the net external force on the deflectable member 14 increases and the member bulges inwardly into the sealed chamber 54, the spaced electrical contacts 80A–80E which are carried on the inner surface 26 of the member 14, make contact with the common contact 28 which is carried on the confronting surface 32 of the second substrate 30. In general, the bulging of the deflectable member 14 initially brings the one or more spaced electrical contacts 80A–80E which are positioned closest to the center of the member 14 into contact with contact 28. Progressively more and more of the spaced electrical contacts 80A–80E thereafter come into contact with the common contact 28. Note that this operation does not require that switches 52A–52E close in any logical order, either based on relative positions or otherwise. This would be represented schematically in FIG. 1 by the progressive closing of switches 52A–52E. The result is the establishment of a complete circuit for current to flow from the first external terminal 34 through the closed switches 52A–52E, through the fusible links 44A–44E which are connected in series with those of the switches 52A–52E that have closed, to the second external terminal 50.

One of the advantages of the present invention is that the switching device 10 may be automatically trimmed so as to enable the subsequent detection or monitoring of a threshold external force applied to the deflectable member. This is accomplished by applying a preselected force, representing the threshold level of the force to be detected, just a little less, to the deflectable member 14. As described above, the deflectable member 14 bulges inward, closing one or more of the switches 52A–52E, completing a circuit through their associated fusible links 44A–44E. Then, a voltage is applied to the first external terminal 34 and the second external terminal 50 so as to cause the flow of current in the completed circuit of an amount sufficient to open circuit the fusible links 44A–44E which are connected in series with those of the switches 52A–52E which have closed. The preselected voltage may then be removed. The current is also selected so that it is not large enough to damage any switch 52A–52E during this fusing operation.

The result of this trimming operation is that, when the switching device 10 is placed in a detecting or monitoring circuit, it will not complete a circuit within the switching device 10 upon application to the deflectable member 14 of an external force which is the same as or less than the force applied in the trimming operation. Only higher levels of force applied to the deflectable member 14 will result in the closure of one or more of switches 52A–52E whose associated fusible links have not been rendered open by the trimming operation. Thus, the exceeding of the trimmed threshold level of the external force is automatically detectable by the switching device.

The present invention also has the advantage of enabling detection of a predetermined threshold value of the externally applied force without regard to the order of operation of the switches 52A–52E, or the identity of the particular switches that are closed. This allows trimming and operation that is more easily, more quickly, and more cheaply accomplished.

Another advantage of the present invention is that, by connecting the second terminals of each of the fusible links 44A–44E to a common terminal 46 within the hermetically sealed chamber 54, and by connecting the common terminal 46 to the second external terminal 50 by a second external connecting means 48 which is a single conductor, the number of penetrations of the hermetic seal is reduced. This reduces the rate of failure of the seal, thereby increasing the reliability of the present invention compared to the prior art.

By reducing the number of external connections to the switching device, the present invention reduces the quantity of some of the materials needed, thereby reducing costs, and also reduces the physical size of the switching device, making it adaptable to a greater number of applications. Simplification of fabrication also reduces the total cost of the device.

Figure 5:
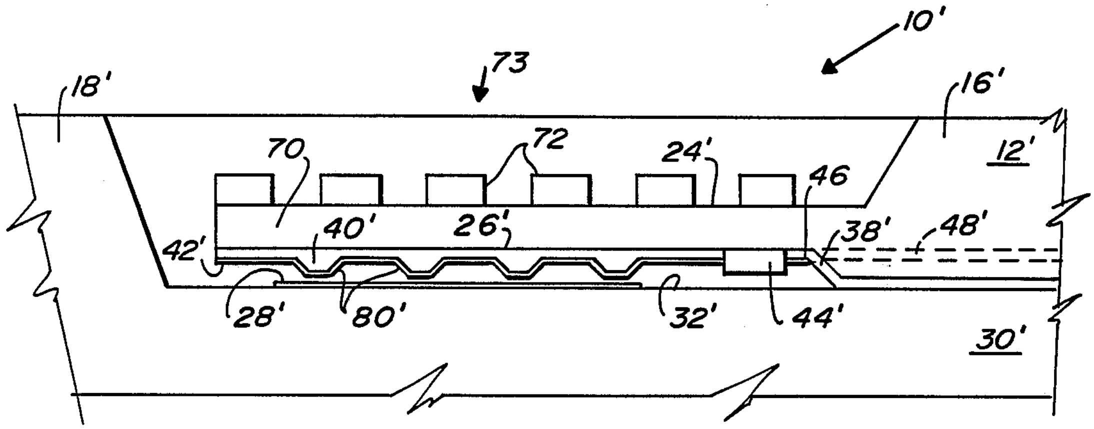
FIG. 5 is an enlarged, fragmentary sectional view of the switching device constructed according to a second embodiment of the present invention.

FIG. 5 shows a microminiature, force-sensitive switching device 10' constructed according to a second embodiment of the invention. FIG. 5 is an enlarged, fragmentary cross-sectional view of a deformable beam 70. The second embodiment is designed to respond to changes in acceleration forces applied to the switching device 10'.

The construction of switch 10' is substantially the same as that of the first embodiment, except that the deflectable member takes the form of a reduced-thickness beam 70. The beam 70 may be formed integrally with, and anchored to, opposite thick side regions 16' and 18' of the first substrate 12' so that deflection occurs first in the central beam region, then progressively outwardly toward the thick side regions 16' and 18' of the first substrate 12'. Alternatively, the beam 70 may have a cantilever construction, only one end of the beam 70 being integrally formed from, and anchored to, the first substrate 12'. In this form, deflection occurs first at the beam's free end, then occurs progressively toward the beam's anchored end. FIG. 5 represents the latter type of beam construction.

The cantilever-beam member 70 may be etched from the silicon first substrate 12'. A plurality of spaced electrical contacts 80'A–80'E are carried on the inner surface 26' of the beam 70, the contacts being formed by coating insulative buttons, such as buttons 40', with a conductive layer 42'. Alterntively, buttons 40' may be formed as part of conductive layer 42', rather than being a part of insulative layer 38'. A common contact 28' is carried on the surface of the second substrate 30' confronting the inner surface 32' of the beam 70 and the spaced electrical contacts 80'A–80'E.

Each of the spaced electrical contacts 80'A–80'E is connected to the first terminal of one of a plurality of fusible links represented in FIG. 5 by fusible link 44'. The second terminal of each of the fusible links 44' is connected to a common terminal 46.

The beam switch described may be adapted either for acceleration or temperature detection. FIG. 5 illustrates the inclusion of a series of mass elements 72 which make the beam 70 responsive to changes in acceleration in the direction of arrow 73. Various sites of attachment of the mass elements 72 to the beam 70, other than as shown in FIG. 5, would be possible without departing from the present invention. The force of acceleration acting on the masses 72 cause the beam 70 initially to deflect from a relaxed condition toward a strained condition in which the beam's free end begins to flex inwardly toward the common contact 28' on the surface 32' of the second substrate 30'. As the acceleration force is increased, the beam 70 is increasingly deflected so as to bring first one then progressively more of the spaced electrical contacts 80'A–80'E against the common contact 28'.

In a temperature-detecting application [embodiment not shown], the beam 70 would include a metallic inner layer whose temperature coefficient of expansion is different than that of the first substrate 12' on which the metallic layer is carried. The beam 70 would have a relaxed condition at a selected lower temperature and the switches 80'A–80'E would be open. As the temperature to which the beam is exposed increases, the relatively greater thermal expansion in the metal layer causes the beam 70 to deflect inwardly, closing first one then progressively other switches 80'A–80'E to allow the detection or monitoring of temperature changes.

The second embodiment of the invention shown in FIG. 5 thus enables the trimming of the switching device in the same manner as described in the first embodiment.

A trimmable force sensitive switch according to the present invention may also be constructed wherein a change in force deflects a deformable member from a more strained to a less strained state to thereby cause one and then more switches to close. Such a device would have utility, for example, where the sealed chamber 54 is initially at a higher pressure than externally thereto. Increasing external pressure in this case would move the deflected member toward a more relaxed state defined to be when all of the switches have closed.

From the foregoing, it can be appreciated how the objects of the invention are met so as to gain advantages over the prior art. The invention provides a microminiature, force-sensitive switching device for detecting or monitoring of a preselected threshold level of an external condition such as pressure, acceleration or temperature, the threshold level being set easily, quickly, and economically, without regard to the order of operation of the individual switches of the switching device. The device reduces the failure rate of the hermetic seal, thereby increasing reliability; it simplifies the fabrication and trimming of the device, thereby making it suitable for mass production; and it reduces the cost of manufacturing and trimming the device.

While various embodiments of the invention have been described herein, it will be appreciated that various changes and modifications may be made without departing from the spirit and scope of the invention.

What is claimed is:

1. A microminiature, force-sensitive, trimmable switching device comprising:

a deflectable member which is deflected as a function of the amount of force applied to the member;

a plurality of switches including a common contact and a plurality of spaced electrical contacts, the state of said switches being controlled by deflection of said deflectable member such that progressively greater deflection of said member causes connection of said common contact initially to one and then progressively to more of said spaced electrical contacts;

a plurality of fusible links, each said fusible link including a first terminal connected to one said switch and a second terminal; and a common terminal connected to said second terminals of said fusible links.

2. The switching device of claim 1 further comprising means for applying a preselected voltage to said common contact and said common terminal such that when one or more said switches are closed and said preselected voltage is applied, said fusible links in series with said closed switches are caused to open circuit.

3. The switching device of claim 1 wherein said deflectable member comprises a reduced-thickness portion of a first substrate and wherein a second substrate is sealed to said first substrate to define a sealed chamber containing said fusible links, said switches and said common contact and said common terminal, and wherein said spaced electrical contacts are carried on the surface of one of said deflectable member and said second substrate and said common contact is carried on the confronting surface of the other of said deflectable member and said second substrate.

4. The switching device of claim 3 wherein said reduced-thickness portion of the first substrate is a deflectable diaphragm integrally formed from said first substrate and continuous therewith.

5. The switching device of claim 3 wherein said reduced-thickness portion of the first substrate is a deflectable beam integrally formed from said first substrate and connected at each end to said first substrate.

6. The switching device of claim 3 wherein said reduced-thickness portion of the first substrate is a deflectable beam integrally formed from said first substrate and connected at one end to said first substrate.

7. The switching device of claim 3 wherein said seal comprises a hermetic seal.

8. The switching device of claim 3 wherein said first substrate and said deflectable member are silicon and said second substrate is glass.

9. The switching device of claim 3 further comprising a first external terminal positioned on said first or second substrate external to said sealed chamber; a second external terminal positioned on said first or second substrate external to said sealed chamber; a first external connecting means extending from said common contact through said hermetic seal between said first substrate and said second substrate to said first external terminal; and a second external connecting means for connecting said common terminal to said second external terminal.

10. The switching device of claim 9 wherein said first external connecting means includes a single feed-through conductor.

11. The switching device of claim 1 further comprising one or more mass elements attached to said deflectable member.

12. The switching device of claim 1 wherein said common contact includes a planar conductive surface.

13. A method for automatically trimming a micro-miniature, force-sensitive switching device including a deflectable member whose deflection is caused by changes in an external condition; first and second common contacts; a plurality of switches, each having a first switch terminal and a second switch terminal, each said first switch terminal being connected to said first common contact, the state of each of said switch controlled by the deflection of the deflectable member, such that progressively greater deflection of said member causes closure of one and then progressively more of said switches, a plurality of fusible links, each including a first terminal connected in series with a respective one of the second switch terminals, and a second terminal connected to said second common contact; said method comprising the steps of:

applying a preselected threshold force to the deflectable member, thereby causing its deflection and the closing of one or more switches; and applying a preselected voltage to said first and second common contacts such that current flows through the closed switches and through the fusible links connected in series with the closed switches, thereby permanently open-circuiting such fusible links.

14. A method claim 13 wherein said step of applying a preselected threshold force to said deflectable member comprises applying a force which causes the deflection of said deflectable member from a position of higher strain to a position of lesser strain.

15. A method according to claim 13 wherein said step of applying a preselected threshold force to said deflectable member comprises applying a force which causes the deflection of said deflectable member to increase from a relaxed state to an increasingly more strained state.

* * * * *